June 26, 1962   I. N. HURST   3,041,487
SHADING COIL AND POLE PIECE FOR SYNCHRONOUS MOTOR
Filed Dec. 10, 1957   3 Sheets-Sheet 1
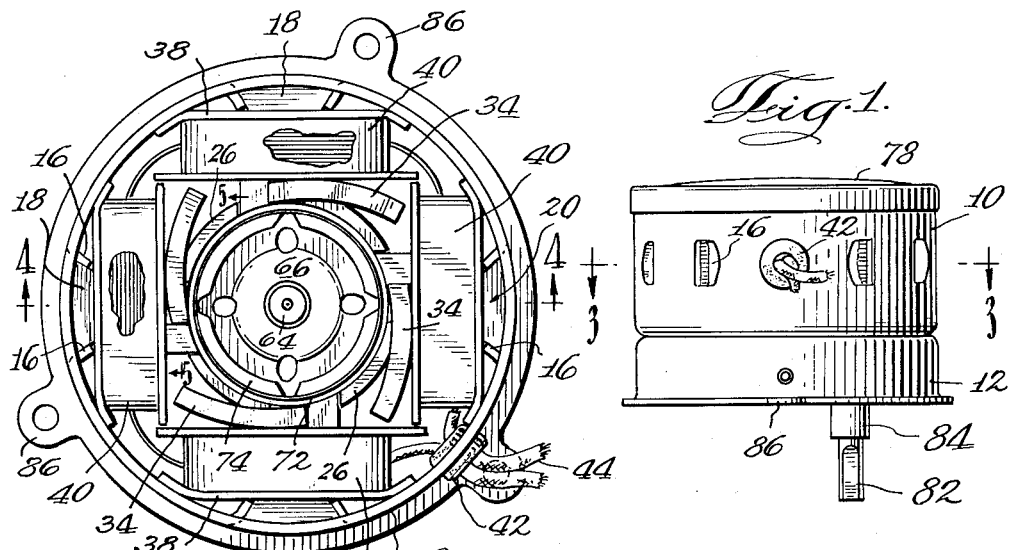
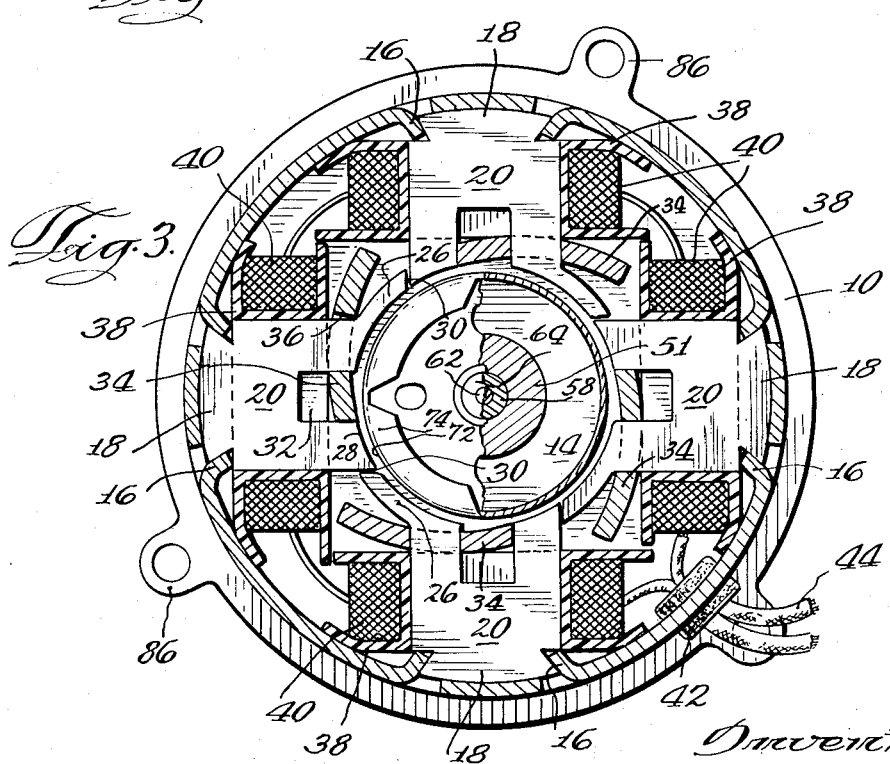
Inventor
Ira Newton Hurst
By
Graf, Nierman & Burmeister
Attorneys June 26, 1962  I. N. HURST  3,041,487
SHADING COIL AND POLE PIECE FOR SYNCHRONOUS MOTOR
Filed Dec. 10, 1957  3 Sheets-Sheet 2
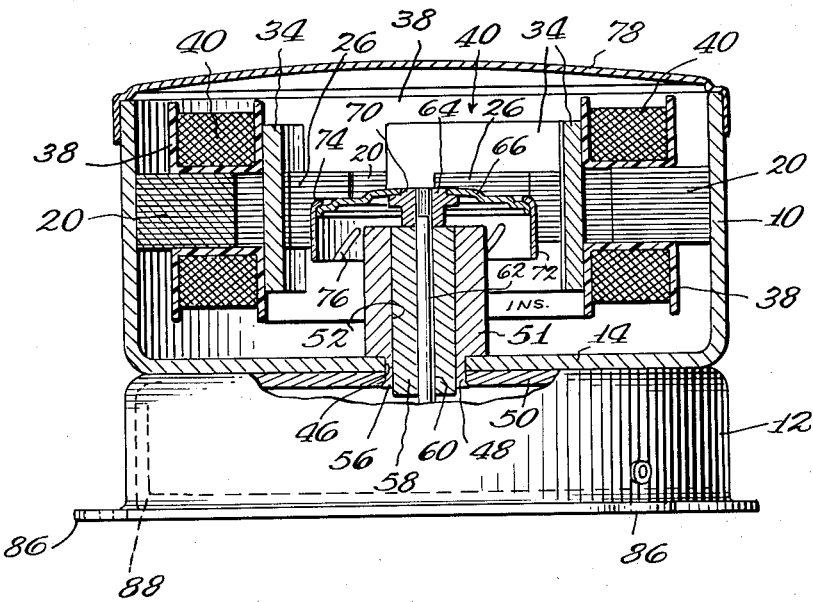
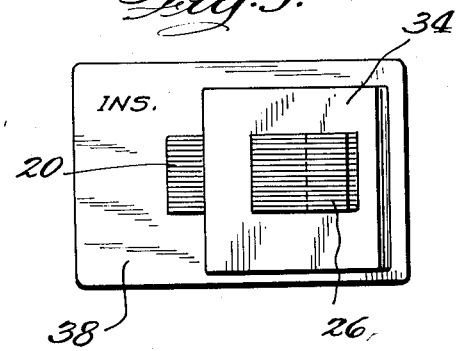 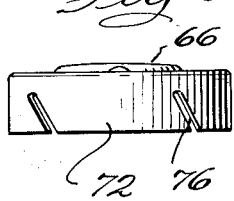
Inventor
Ira Newton Hurst
By
Graf, Dierman & Burmeister
Attorneys

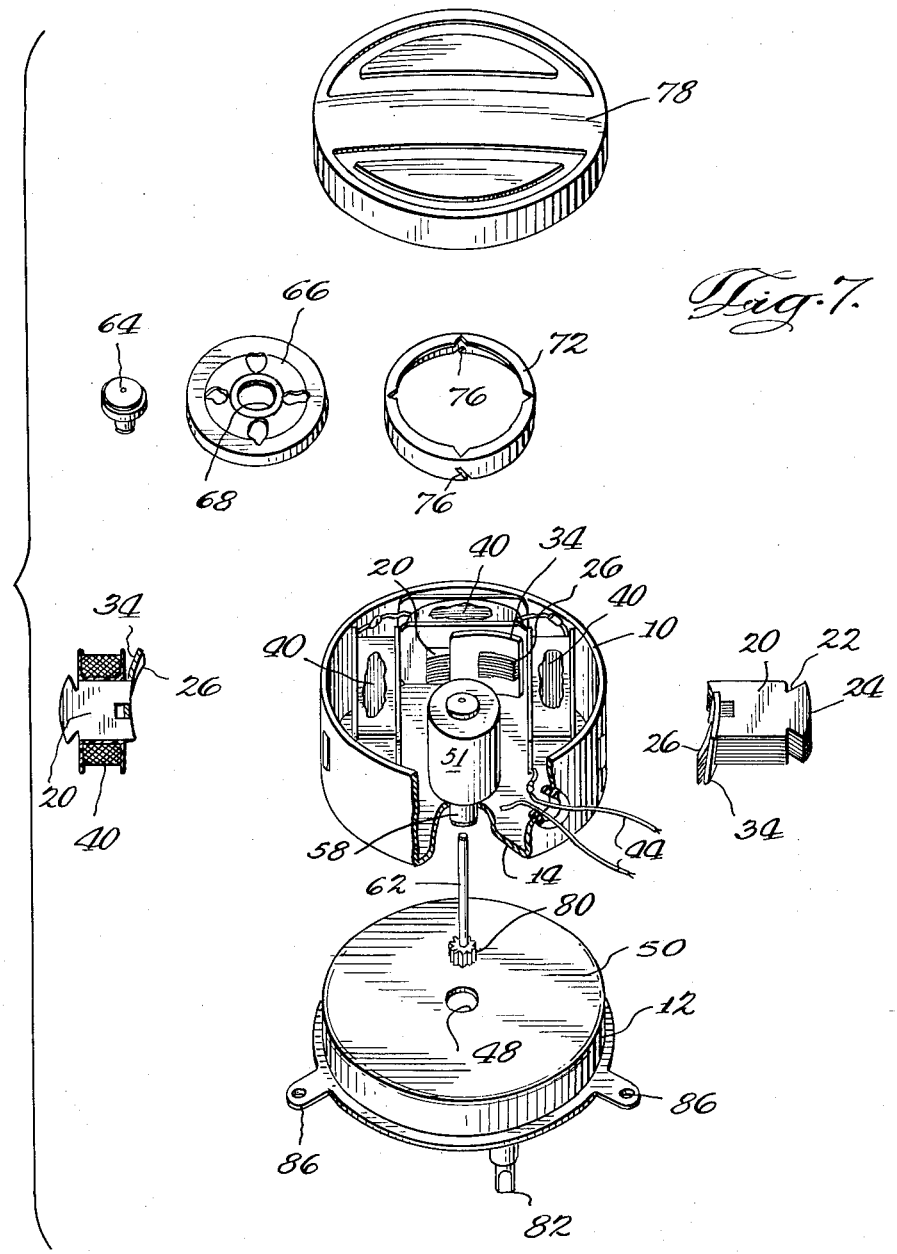

United States Patent Office 3,041,487
Patented June 26, 1962

3,041,487
SHADING COIL AND POLE PIECE FOR
SYNCHRONOUS MOTOR
Ira Newton Hurst, Princeton, Ind., assignor to Hurst
Tool & Mfg. Co., Inc., Princeton, Ind., a corporation
of Indiana
Filed Dec. 10, 1957, Ser. No. 701,797
7 Claims. (Cl. 310—172)

The present invention relates to electric motors, and more particularly to synchronous shaded pole electric motors.

The many applications for electric motors in the present technology make low cost motor construction highly desirable. It is one of the objects of the present invention to provide an electric motor of lower cost than motors of the same characteristics presently known.

The inventor's motor construction employs novel pole pieces which may be produced by an inexpensive punching process. A simple and inexpensive means is provided for securing the pole pieces to a housing, and the housing is employed as part of the magnetic circuit, thereby reducing the materials required for the pole pieces and making possible a smaller sized motor.

Another object of the present invention is to provide a shaded pole synchronous motor of greater power for a given size than heretofore possible. This object of the invention is achieved by providing a novel pole piece and shading coil assembly.

A further object of the present invention is to provide a synchronous shaded pole electric motor with better operating characteristics than those heretofore known. In addition to the novel pole piece construction, referred to above, the object has been achieved by a novel rotor construction for an electric motor which is also inexpensive. The inventor's novel rotor construction, when employed in a synchronous motor, permits the rotor to slip relative to the rotating electrical field during starting, but resists slip during periods of operation.

These objects of applicant's invention, and additional objects, will be more fully understood and appreciated from a further reading of this disclosure, particularly when viewed in the light of the drawings, in which:

FIGURE 1 is a front elevational view of the motor constructed in accordance with the teachings of the present invention;

FIGURE 2 is a plan view of the motor illustrated in FIGURE 1 with the cover removed;

FIGURE 3 is a sectional view taken along the line 3—3 of FIGURE 1;

FIGURE 4 is a sectional view taken along the line 4—4 of FIGURE 2;

FIGURE 5 is an enlarged view of one of the pole pieces taken along the line 5—5 of FIGURE 2;

FIGURE 6 is an enlarged elevational view of the rotor for the motor; and

FIGURE 7 is an exploded view of the motor.

As illustrated in FIGURES 1, 4, and 7, the motor assembly includes two housings 10 and 12 which are secured together. The housing 10 contains the elements of the electric motor, and the housing 12 contains a gear train for adjusting the rotational rate of the motor to the desired value.

The housing 10 is cylindrical in shape, closed at one end 14, and constructed of material having low reluctance. Four pairs of confronting tabs 16 are cut from the wall of the housing 10 and bent inwardly from the wall of the housing to form four dove tail ways, which are equally spaced about the perimeter of the housing 10 and designated 18. Each pair of tabs 16 form a single way 18, since the free ends of the tabs 16 confront each other, and tabs 16 form an angle less than 180 degrees.

Four pole pieces 20 are secured to the housing 10 by the tabs 16. Each of the pole pieces 20 is formed of a plurality of laminations of low reluctance material, and has a pair of confronting flat sided notches 22 at one end. The laminations may be punched from a sheet and then assembled to form a pole piece. The notches of the pole pieces engage the tabs 16 of the ways 18. The end 24 of each pole piece 20 adjacent to the notches 22 is curved on the same radius as the housing 10. In one construction, both the housing 10 and the pole pieces 20 are constructed of magnetic iron. Each of the pole pieces has a horn 26 which extends from the pole piece toward one of the adjacent pole pieces. The end 28, which confronts the axis of the housing 10 of each pole piece 20, is curved about the axis of the housing 10, and each of the horns 26 is also curved on the same radius. A small space 30 is disposed between the horn 26 of each pole piece 20 and the adjacent pole piece. Each of the horns 26 of the pole pieces extends toward the side of the adjacent pole piece remote from the horn of said pole piece.

The end 28 of each pole piece 20 is provided with a central slot 32 which is parallel to the axis of the housing. A shading coil 34 is mounted in each of the slots 32. Each of the shading coils 34 is constructed of a generally rectangular sheet of low electrical resistance material and is provided with an aperture 36 to accommodate the portion of the pole piece 20 between the slot 32 and the edge thereof adjacent to the horn 26. The aperture 36 of the shading coil 34 snuggly accommodates this portion of the pole piece 20 to retain the shading coil in position. The portion of the shading coil confronting the horn of the pole piece 20 is curved toward the horn. The shading coils may also be produced by a punching process.

Each of the pole pieces 20 accommodates a coil bobbin 38 between the notches 22 therein and the shading coil 34 mounted thereto. A coil 40 of electrically conducting wire is wound about each of the bobbins 38, and the coils are electrically connected in series with each other. The coils are connected to produce fields in opposite directions in adjacent pole pieces. The housing 10 is provided with a grommeted aperture 42, and a pair of electrically insulated wires 44 extend through the aperture 42 and are electrically connected in series with the coils 40.

The housing 10 is provided with an axial aperture 46 in the end 14 thereof, and the housing 12 has a confronting aperture 48 in the end 50 thereof; the ends 14 of the housing 10 and 50 of the housing 12 abutting each other. A hollow sleeve 51, which is provided with an axial bore 52, has a portion with a reduced outer diameter, designated 56, which extends through the apertures 46 and 48 and is wedged therein. A second sleeve 58 is secured within the bore 52 of the first sleeve 51, and the second sleeve is provided with a bore 60 which is disposed on the axis of the housing 10. A shaft 62 extends through the bore 60, and terminates in a hub 64 at one end which confronts the pole pieces 20. The hub 64 mounts a nonmagnetic spider 66 which is circular in form and provided with a plurality of spaced apertures. The spider 66 has a central aperture 68 which is wedged about an outwardly extending collar 70 on the surface of the hub 64 opposite the sleeves 51 and 58. A cylindrically shaped rotor 72, constructed of high remanence magnetic material, fits snuggly about the spider 66, and is provided with a rolled edge 74 which extends over the edge of the spider 66 to aid in securing the rotor 72 to the spider 66. The wall of the cylindrical rotor 72 is provided with a plurality of slots 76 which are equally spaced about its perimeter. The slots 76 extend into the wall from the edge thereof opposite the spider 66 at an angle relative to the axis of the cylindrical rotor 72. All of the slots 76 are disposed at approximately the same angle relative to the axis of the rotor, and this angle must be less than 45 degrees.

The shaft 62 and second sleeve 58 are constructed of bearing materials, such as brass. The spider 66 is constructed of nonmagnetic material, such as aluminum. The rotor 72 is constructed of high remanence material, such as hardened steel. The shading poles are constructed of material of low electrical resistance, such as copper. A dust tight cover 78 is secured about the open end of the housing 10.

The housing 12 contains a gear train which has not been specifically illustrated, since conventional gear trains are suitable for transforming the rotation rate of the shaft 62 to the desired rate. The shaft 62, which is secured to the rotor 72 and rotates therewith, extends into the housing 12, and a pinion gear 80 is secured to the end of the shaft within the housing 12 to couple the rotor 72 to the gear train. In like manner, a second shaft 82 extends from the gear train through a sleeve 84 which is secured to the housing 12 in order to take power from the motor. A plurality of mounting lugs 86 are secured to the housing 12 to permit the motor to be suitably mounted. The gear train itself may be conveniently mounted within a cylindrical cup-shaped member with a closed end, this member being designated 88 in FIGURE 4, and the cylindrical member 88 slipped into the cylindrical cup-shaped housing 12.

As will be readily apparent to those skilled in the art, the foregoing construction has many advantages. The motor may be readily assembled, since each of the pole pieces 20 may have the shading coil 34 and the energizing coil 40 assembled thereon, and then the assembled pole piece energizing coil and shading coil merely slipped into the ways provided by the confronting pairs of tabs 16. In like manner, the entire rotor assembly, which includes the hub 64, spider 66 and rotor 72, may be assembled exterior to the housing 10 and merely slipped into the bore 60. Further, the pole pieces 20 and shading coils 34 may be punched out by mass production methods. It is thus clear that the motor may be readily and inexpensively fabricated.

In addition, it is to be noted that the rotor, by virtue of the slots 76 therein, may slip slightly relative to the magnetic field when starting, but will have resistance to slipping when synchronous speed is reached. Also, the horns on the shaded half of the pole pieces 20 extend to the oppositely polarized pole pieces, hence increasing the flux flowing through the shaded portion of the pole piece. This construction yields increased power for the motor.

Many other and additional advantages of this construction will be apparent to those skilled in the art. It is, therefore, intended that the scope of the present invention be not limited to the foregoing disclosure, but rather only by the appended claims.

The invention claimed is:
1. A synchronous electric motor comprising a cylindrical housing of low reluctance material having a plurality of symmetrically arranged pairs of slots, the slots of each pair having confronting parallel straight central portions and leg portions on each end of each central portion extending away from the other slot of the pair to form a pair of tabs with straight confronting ends parallel to the axis of the housing, the tabs of each pair being bent inwardly by approximately equal acute angles forming a guide way, a pole piece keyed within each guide way having an end confronting the axis of the housing, said poles and housing forming a low reluctance portion of a magnetic circuit, a rotor disposed between the pole pieces comprising a ferromagnetic cylindrical member having equally spaced slots and nonmagnetic means for rotatably supporting said rotor between the pole pieces.

2. A synchronous electric motor comprising a cup-shaped housing of low reluctance material having in the cylindrical portion thereof a plurality of symmetrically arranged pairs of slots, the slots of each pair having confronting parallel straight central portions and leg portions on each end of each central portion extending away from the other slot of the pair to form a pair of tabs with straight confronting ends parallel to the axis of the housing, the tabs of each pair being bent inwardly by approximately equal acute angles forming a guide way, a pole piece constructed of low reluctance material having one end curved on a radius equal to that of the cylindrical portion of the housing and a pair of indentations on opposite sides of the pole piece adjacent to the curved end thereof, one of said pole pieces being disposed in each guide way with the tabs of the guide way disposed in the indentations of the pole piece, and a rotatably mounted rotor disposed on the axis of the housing confronting the ends of the pole piece, said pole pieces and housing forming a low reluctance portion of a magnetic circuit, remote from the housing.

3. A synchronous electric motor comprising a cup-shaped housing of low reluctance material having in the cylindrical portion thereof four symmetrically arranged pairs of slots, the slots of each pair having confronting parallel straight central portions and leg portions on each end of each central portion extending away from the other slot of the pair to form a pair of tabs with straight confronting ends parallel to the axis of the housing, the tabs of each pair being bent inwardly by approximately equal acute angles forming a guide way, a pole piece constructed of low reluctance material having one end curved on a radius equal to that of the cylindrical portion of the housing and a pair of indentations on opposite sides of the pole piece adjacent to the curved end thereof, one of said pole pieces being disposed in each guide way with the tabs of the guide way disposed in the indentations of the pole piece, said pole pieces and housing forming a low reluctance portion of a magnetic circuit, a rotor comprising a hollow cylindrical member constructed of magnetic material of high remanence, said member having slots extending therein from one end equal in number to the number of pole pieces and symmetrically disposed about the periphery of the member, and nonmagnetic means for rotatably mounting the cylindrical member coaxially with the housing and confronting the ends of the pole pieces remote from the housing.

4. A synchronous electric motor comprising the elements of claim 1 wherein each of said pole pieces has a horn-shaped portion extending outwardly from the end thereof remote from the housing coaxially of the housing toward the adjacent pole piece and forms a magnetic gap with the adjacent pole piece, in combination with means to establish a magnetic field in each of the pole pieces, the magnetic field being oppositely directly in adjacent pole pieces, a shading coil comprising an electrically conducting member having an opening therein secured to the end of each pole piece remote from the housing, the horn of said pole piece extending through the opening in the shading coil.

5. A synchronous electric motor comprising the elements of claim 3 wherein each of said pole pieces have a horn-shaped portion extending outwardly from the end thereof remote from the housing coaxially of the housing toward the adjacent pole piece and forms a magnetic gap with the adjacent pole piece, in combination with means to establish a magnetic field in each of the pole pieces, the magnetic field being oppositely directed in adjacent pole pieces, a shading coil comprising an electrically conducting member having an opening therein secured to the end of each pole piece remote from the housing, the horn of said pole piece extending through the opening in the shading coil.

6. A synchronous electric motor comprising the elements of claim 4 wherein the means for establishing a magnetic field comprise a coil disposed about each of the pole pieces between the shading coil of electrically conducting wire, said coils being serially connected and adapted to be connected to an alternating current source.

7. A shaded pole synchronous electric motor comprising the elements of claim 1 wherein the pole pieces are constructed of a plurality of laminations and have a slot centrally disposed in the end thereof remote from the housing parallel to the axis of the housing, said pole pieces also having a horn extending outwardly from one edge of the end of the pole piece remote from the housing, and a shading coil in the form of a member of electrically conducting material having an opening therein secured within the slot of the pole piece, the horn of the pole piece extending through the opening in the shading coil.

References Cited in the file of this patent

UNITED STATES PATENTS

| | | |
|---|---|---|
| 1,319,225 | Kester et al. | Oct. 21, 1919 |
| 1,577,976 | Knowlson et al. | Mar. 23, 1926 |
| 2,160,076 | Lux | May 30, 1939 |
| 2,187,180 | Schweitzer | Jan. 16, 1940 |
| 2,295,203 | Darnell | Sept. 8, 1942 |
| 2,402,380 | Dicke | June 18, 1946 |

FOREIGN PATENTS

| | | |
|---|---|---|
| 467,632 | Italy | Dec. 12, 1951 |

UNITED STATES PATENT OFFICE
CERTIFICATE OF CORRECTION

Patent No. 3,041,487 June 26, 1962

Ira Newton Hurst

It is hereby certified that error appears in the above numbered patent requiring correction and that the said Letters Patent should read as corrected below.

Column 4, line 51, for "directly" read -- directed --; line 58, for "have" read -- has --.

Signed and sealed this 18th day of December 1962.

(SEAL)
Attest:

ERNEST W. SWIDER
Attesting Officer

DAVID L. LADD
Commissioner of Patents